No. 684,011. Patented Oct. 8, 1901.
J. VALENTYNOWICZ.
EXPLOSIVE ENGINE.
(Application filed Apr. 15, 1901.)
(No Model.) 3 Sheets—Sheet 1.

WITNESSES:
W. H. Cotton
Arthur S. Seibold

INVENTOR.
Joseph Valentynowicz.
BY
Louis K. Gleeson
ATTORNEY.

No. 684,011. Patented Oct. 8, 1901.
J. VALENTYNOWICZ.
EXPLOSIVE ENGINE.
(Application filed Apr. 15, 1901.)
(No Model.) 3 Sheets—Sheet 2.
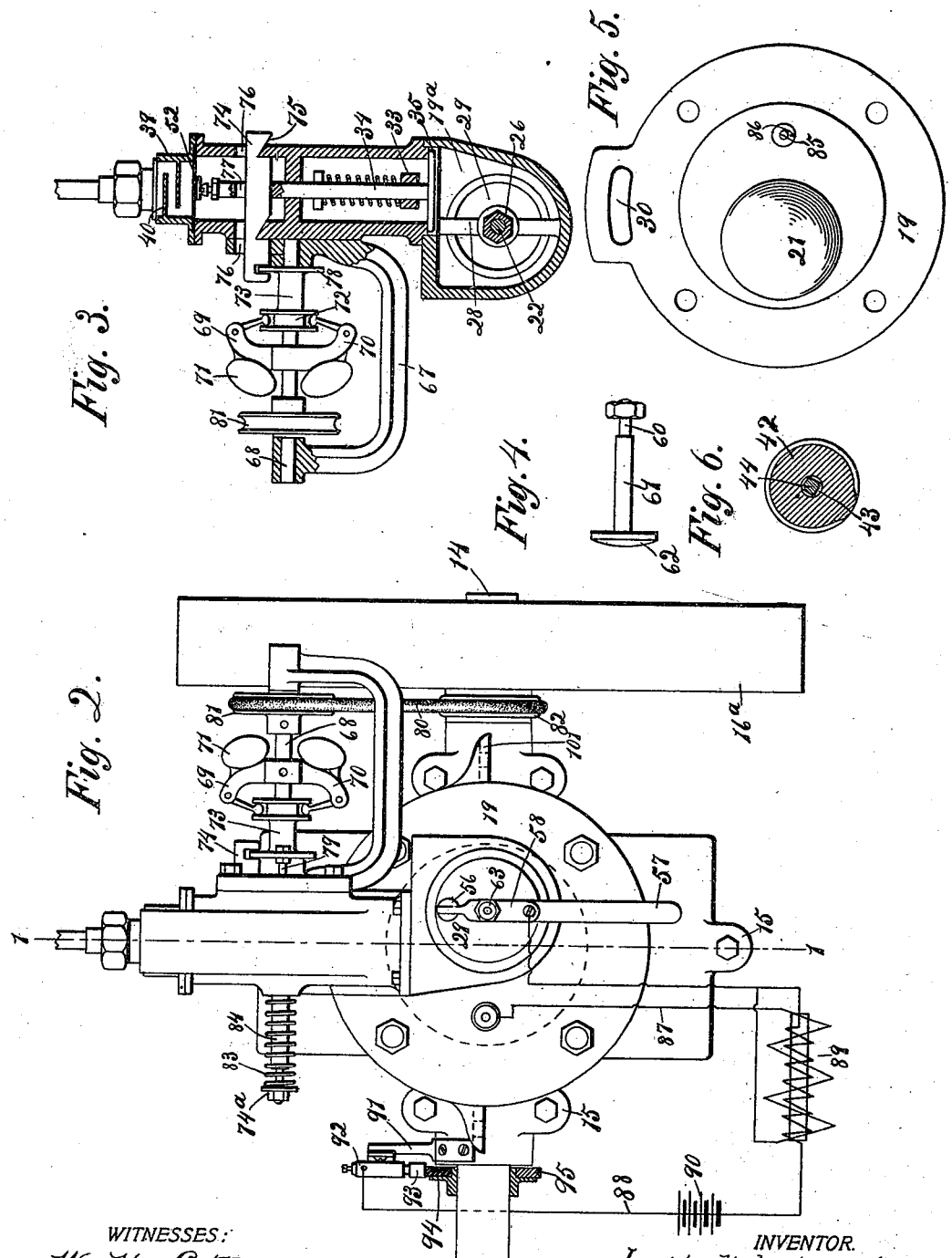
WITNESSES:
W. H. Colton
Arthur B. Seibold
INVENTOR.
Joseph Valentynowicz
BY Louis K. Gleeson
ATTORNEY.
THE NORRIS PETERS CO., PHOTO-LITHO., WASHINGTON, D. C.

No. 684,011. Patented Oct. 8, 1901.
J. VALENTYNOWICZ.
EXPLOSIVE ENGINE.
(Application filed Apr. 15, 1901.)

(No Model.) 3 Sheets—Sheet 3.

WITNESSES:
INVENTOR.
Joseph Valentynowicz.
BY
ATTORNEY.

UNITED STATES PATENT OFFICE.

JOSEPH VALENTYNOWICZ, OF CHICAGO, ILLINOIS.

EXPLOSIVE-ENGINE.

SPECIFICATION forming part of Letters Patent No. 684,011, dated October 8, 1901.

Application filed April 15, 1901. Serial No. 55,997. (No model.)

*To all whom it may concern:*

Be it known that I, JOSEPH VALENTYNOWICZ, a citizen of the United States of America, and a resident of Chicago, county of Cook, and State of Illinois, have invented certain new and useful Improvements in Explosive-Engines, of which the following is a specification and which are illustrated in the accompanying drawings, forming a part thereof.

My invention relates to double-cycle explosive-engines, and has for its object to improve the construction thereof and to provide one which shall be compact in form, free from complication, efficient in operation, and especially adapted for use in connection with automobiles.

The invention is embodied in the accompanying drawings, in which—

Figure 1:
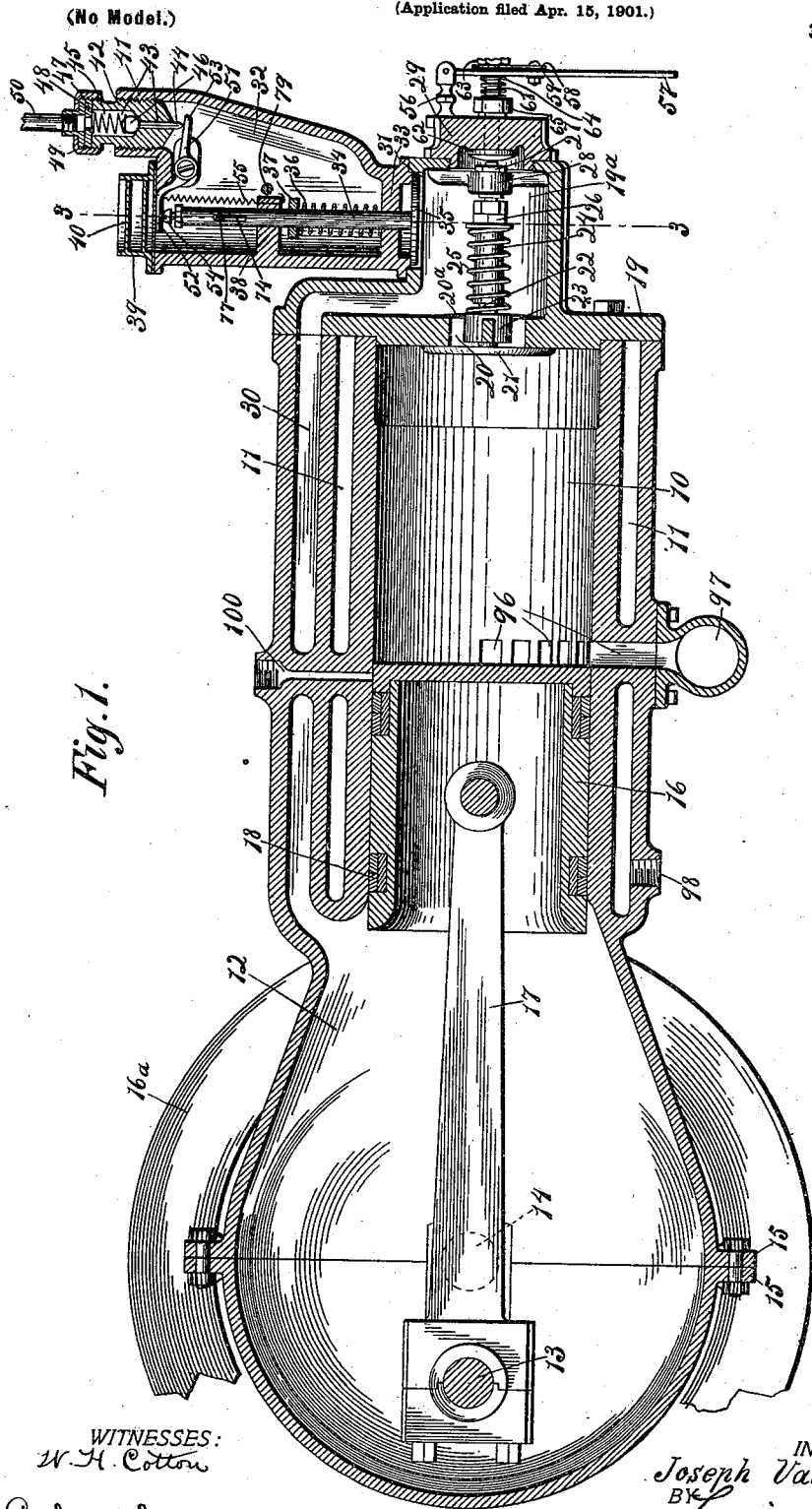
Figure 7:
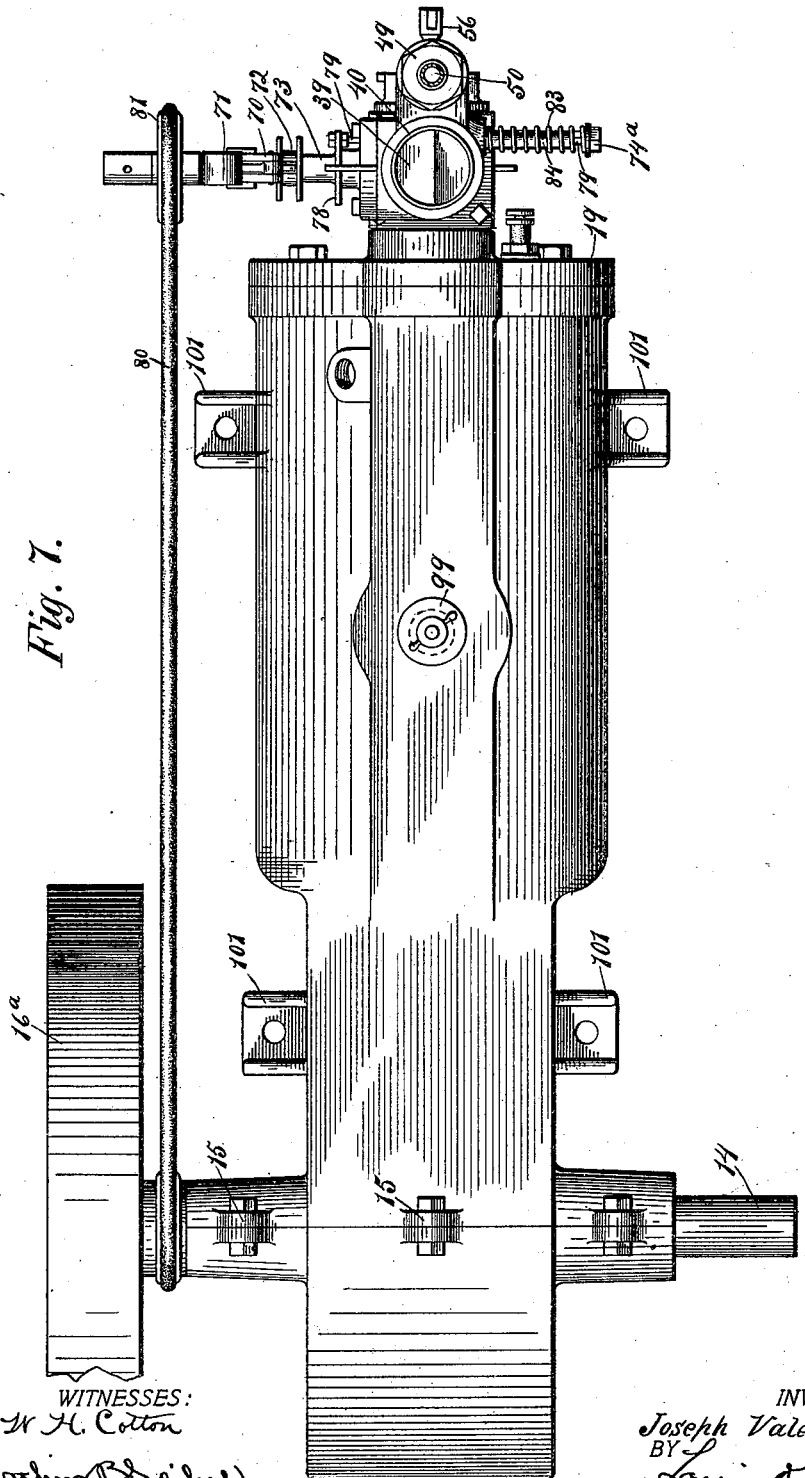

Figure 1 is a section on the line 1 1 of Fig. 2. Fig. 2 is a front elevation. Fig. 3 is a section on the line 3 3 of Fig. 1, illustrating in full lines the governor mechanism. Figs. 4, 5, and 6 are details of the engine, and Fig. 7 is a plan view of the entire engine.

The engine is of the horizontal type, and the body of the same comprises the cylinder 10, surrounded by a water-jacket 11, and provided at one end with a closed chamber 12, in which is located the crank 13 of the crank-shaft 14. The crank-chamber 12, which also serves as a compression-chamber for the explosive mixture of oil and air, is made in two sections secured together by bolts passed through the lugs 15 of each section. The piston 16 is connected to the crank-shaft by a rod 17 in the usual manner and is provided with packing 18 to prevent the escape of the gas or products of combustion past the piston.

The inner end of the cylinder 10 is closed by a head 19, having a chamber 19$^a$, which communicates with the interior of the cylinder by way of the port 20. This port is covered by a piece of gauze netting 20$^a$ for spraying any particles of oil that may be drawn into the cylinder with the explosive mixture and closed by a valve 21, carried by a stem 22, passing through a web 23 in the port 20 and extending into the chamber 19$^a$ of the head 19.

Surrounding the stem 22 is a wearing-sleeve 24, and encircling this sleeve is an expansion-spring 25, reacting between the web 23 and a nut 26. Under the influence of the spring 25 the valve 21 is normally seated and the resistance of the spring may be varied at will by adjusting the nut 26. The end of the stem 22 of the valve 21 projects through a guide-sleeve 27, screwed into the hub of a web 28, formed integral with the chambered head 19 and bridging an opening in the said head, which opening is closed by a cap 29, as illustrated in Fig. 1.

The chamber 19$^a$ of the head 19 communicates with the crank or compression chamber 12 through a passage 30, which extends along the cylinder 10 and in the wall thereof. In the side of the head 19 is an opening 31, communicating with an air and oil mixing chamber 32, secured to the said head. The opening of the mixing-chamber 32 is provided with a web 33, through which passes and reciprocates a valve-stem 34, carrying a valve 35, adapted to close communication with the chamber 19$^a$ of the head 19. Normally the valve is held to its seat by a spring 36, which reacts between the web 33 and a collar 37, secured to the valve-stem 34. The web 33 is assisted in guiding and maintaining the valve-stem 34 in vertical position by a web 38 in the chamber 32.

To the open end of the chamber 32 is secured an elbow 39, and the air to be utilized to vaporize the oil is sucked through this elbow 39, baffle-plates 40 being disposed therein to deaden the noise of the inrushing air. The mixing-chamber 32 has a nipple 41, into which is screwed a plug 42, having a circular passage 43 therethrough.

Reciprocating in the passage 43 and extending beyond the mouth of the same is a rectangular pin 44, providing ducts between it and the wall of the passage for the entrance of the oil to the mixing-chamber 32. The passage 43 of the plug 42 is enlarged to form the valve-cavity 45, the bottom of which is tapered to the passage 43, and seated in this cavity is a ball-valve 46, normally held against the bottom of the cavity and closing the passage 43 by an expansion-spring 47, reacting between the said valve and an apertured disk 48, covering the upper end of the valve-cavity 45 and held in place by a screw-cap 49.

Pivoted within the mixing-chamber 32 is a lever 51, having arms 52 and 53. The arm engages the lower end of the pin 44, while the arm 52 rests upon an adjusting-screw 54, located at the end of the valve-stem 34. A retractile spring 55, one end of which is attached to the web 38 within the chamber 32 and the other to the arm 52 of the lever 51, holds the arms normally in engagement with the pin 44 and the screw 54 of the stem 34. A pipe 50 conducts the oil to the valve-cavity 43, after which it is drawn into the air-receiving chamber 32 before its passage in a gaseous state to the compression-chamber 12.

Projecting from the cap 29, closing the opening of the head 19, is a post 56, to which is pivoted at one end a lever 57, carrying a contact-plate 58, insulated, as at 59, from the said lever. The lever, insulation, and contact-plate are apertured to receive the reduced portion 60, on which the lever plays, of a stem 61, which passes through the cap 29 of the head 19 and is provided at its inner end with a head or button 62, adapted to be moved against the end of the valve-stem 22, projecting beyond the sleeve 27 in the web 28. The contact-plate 58 is held normally in engagement with a nut 63, secured to the end of the stem 61 by a spring 64, reacting between a nut 65, screwed into the cap 29, and the lever 57, but is moved away from the nut 63 when the lever is pushed inwardly to unseat the valve 21 in order to relieve the pressure in the cylinder in starting the engine.

Secured to the side of the mixing-chamber 32 is a U-shaped bracket 67, carrying a shaft 68, journaled in the arms of the bracket. The shaft 68 carries a centrifugal governor-frame 69, to the arms 70 of which are pivoted the weight-levers 71, the arms of which engage an annular recess 72 of a sleeve 73, slidably mounted on the shaft 68.

Passing through apertures 76, the bottoms of which are inclined in the walls of the mixing-chamber 32, is a sliding bar 74, provided at its lower edge with inclined notches 75, which register with the inclined bottoms of the apertures 76. The valve-stem 34 is provided with an aperture 77, through which passes the sliding bar 74, one end of which bar is notched to engage an annular flange 78 of the sleeve 73.

Projecting through the chamber 32 in a line parallel with the shaft 68 is a rod 79, one end of which is passed through and bolted to the annular flange 78. Motion is transmitted to the governor-shaft through the medium of a belt 80 running over a pulley 81 on the shaft 68 and deriving its motion from a pulley fixed to the engine-shaft 14. The governor acts in opposition to a spring 83, encircling a sleeve 84, in which the rod 79 slides, and reacting between the wall of the chamber 32 and an adjustable nut 74ª on the rod 79.

The operation of the governor to regulate the supply of the explosive mixture will be readily understood. When the engine exceeds a certain speed, the weights are thrown outwardly by centrifugal force, shifting the sleeve 73 on the governor-shaft 68 and moving the sliding bar 74, so that it, coacting with the inclined bottoms of the apertures in the walls of the chamber 32, is caused to move upwardly, thereby limiting the downward or opening movement of the valve, and consequently diminishing the supply of explosive mixture entering to the engine.

Any suitable electrical igniter for the charge in the cylinder may be employed. The one I have shown in the drawings of the jump-spark variety consists of a pair of electrodes 85 and 86, passed through the head 19 and into the inner end of the cylinder. The electrode 85 is insulated from the cylinder and is in electrical connection with the secondary circuit 87, which with the primary circuit 88 includes a sparking-coil 89 and the battery 90. The primary circuit 88 is in connection with the contact-plate 58, carried by the lever 57.

The circuit maker and breaker consists of a post 92, carried by but insulated from a bracket 91 and supporting a brush 93. The brush 93 has contact with a disk carried by the shaft 14 of the engine, which disk is composed of an insulating material 94 and a copper section 95, and its rotation is so timed that a spark is created at the electrodes just as the piston has reached the limit of its instroke.

The cylinder is provided with a series of exhaust-ports 96, communicating with an elbow 97, and are so disposed that they are entirely uncovered by the piston at the extreme outward movement thereof.

In starting the engine, assuming the piston to be in the position illustrated in Fig. 1, the fly-wheel 16ª is turned by hand, and the piston 16 moving on the instroke a suction is created in the crank-chamber 12, causing the valve 35 between the chamber 19ª in the head 19 and the mixing-chamber 32 to open and a supply of air to be sucked in through the elbow 39. As the valve 35 opens the screw 54 of the stem 34 is withdrawn from engagement with the arm 52 of the lever 51, the spring 55, secured to the web 38, then drawing the arm 52 downwardly, thereby raising the arm 53 and sliding the pin 44 upwardly and lifting the ball-valve 46 from its seat, permitting a supply of oil under the influence of the inrushing air to be drawn into the chamber 32, which, mingling with the air, enters the chambered head 19, and passes out through the passage 30 and into the crank-chamber 12. Inasmuch, however, as all of the oil drawn into the chamber 32 by the inrushing air is not vaporized and carried in that condition into the compression-chamber 12, some of it dropping to the bottom of the chamber 19ª of the head 19, the charge or mixture carried to the chamber 12 will not be rich enough to be of an explosive character, and there is therefore no danger of an explosion in the compression-chamber even though the piston become excessively heated when the engine has been running for a considerable period. As soon as the piston begins its outstroke the mixture contained in the chamber 12 is compressed and then forced back through the passage 30 and the chamber 19ª and past the valve 21 into the cylinder, picking up on its return such oil as may have fallen to the bottom of the chamber 19ª and spraying it through the gauze 20ª, covering the port 20. During the outstroke of the piston the valve 35 of the mixing-chamber 32 is closed by its spring and the supply of explosive fluid shut off. At the limit of the next instroke of the piston the electric circuit is closed through the brush 93 and the copper section of the disk, and the explosion takes place, forcing the piston outwardly. As soon as the end of the piston opens the exhaust-ports 96 on its outstroke the air originally in the cylinder in the first instance and thereafter the products of combustion begin to exhaust, and at the same time, a new charge having been drawn into the crank-chamber on the previous instroke of the piston, it is forced into the cylinder, as before. This action is repeated, and the explosion takes place at every instroke of the piston. If the pressure in the cylinder is too great to permit of the flywheel 16ª being easily turned by hand in starting the engine, the pressure may be relieved by opening the valve 21, which is accomplished by pushing in the lever 57, as has already been explained.

In the engine herein described the passage 30 serves to conduct the charge from the mixing-chamber 32 to the crank-chamber 12, wherein it is compressed, and also to reconduct the same to the cylinder. This arrangement simplifies construction, thereby reducing cost, and also economizes space—a matter of considerable importance in adapting an engine to an automobile.

The water in the water-jacket may be drawn off through an opening 98 and the piston lubricated by an oil-cup 99, feeding oil through a passage 100, communicating with the interior of the cylinder.

The engine is provided with brackets 101, secured to the sides of the engine-body, providing means for supporting the same from the automobile-frame.

I claim as my invention—

1. In an explosive-engine, in combination, a cylinder, a compression-chamber, a chambered head located at the end of and having a valve-closed port opening into the cylinder, means for supplying an explosive mixture to the chamber of the head, and a passage for conducting the mixture to the compression-chamber and also for reconducting the same to the cylinder through the chambered head, and the bottom of the chambered head being located below the port opening into the cylinder so that any oil that may not be vaporized in the mixing-chamber will be caught by and remain in the said chambered head until picked up by the mixture entering the cylinder.

2. In an explosive-engine, in combination, a cylinder, a compression-chamber, the cylinder having a chambered head provided with a valve-closed opening communicating with the cylinder, a fuel-mixing chamber opening into the chambered head, a spring-controlled valve for closing said opening and the stem of which extends into the mixing-chamber, an oil-passage entering the mixing-chamber, a valve for closing the oil-passage, a pin projecting out of the oil-passage, a pivoted lever one arm of which engages the pin the other arm resting upon the stem of the valve of the mixing-chamber, and a spring for moving the lever on its pivot on the opening of the valve of the mixing-chamber to open the valve of the oil-passage.

3. In an explosive-engine, in combination, a cylinder, a compression-chamber, a fuel-mixing chamber having an opening leading to the engine, a valve for closing said opening and having a stem, a passage for supplying oil to the chamber, a valve for the oil-passage, a lever held by the stem of the valve of the mixing-chamber, means for moving the lever when released by the valve-stem to open the oil-valve, a governor-shaft and connection for driving the same, a spool loose upon the shaft, a governor for sliding the spool, the valve-stem having a slot, and a rod passing through the slot and resting upon inclined guides for limiting the play of the valve and having a slot to receive a head of the sliding spool.

JOSEPH VALENTYNOWICZ.

Witnesses:
ARTHUR B. SEIBOLD,
E. M. KLATCHER.